Feb. 19, 1957 G. W. LECK 2,782,374

FREQUENCY MODULATION WITH GAS CELL CONTROL

Filed April 29, 1953

INVENTOR.
George W. Leck

BY Milton S. Winters

ATTORNEY

United States Patent Office 2,782,374
Patented Feb. 19, 1957

2,782,374

FREQUENCY MODULATION WITH GAS CELL CONTROL

George W. Leck, Princeton, N. J., assignor to Radio Corporation of America, a corporation of Delaware Application April 29, 1953, Serial No. 351,866

8 Claims. (Cl. 332—19)

Figure 1:
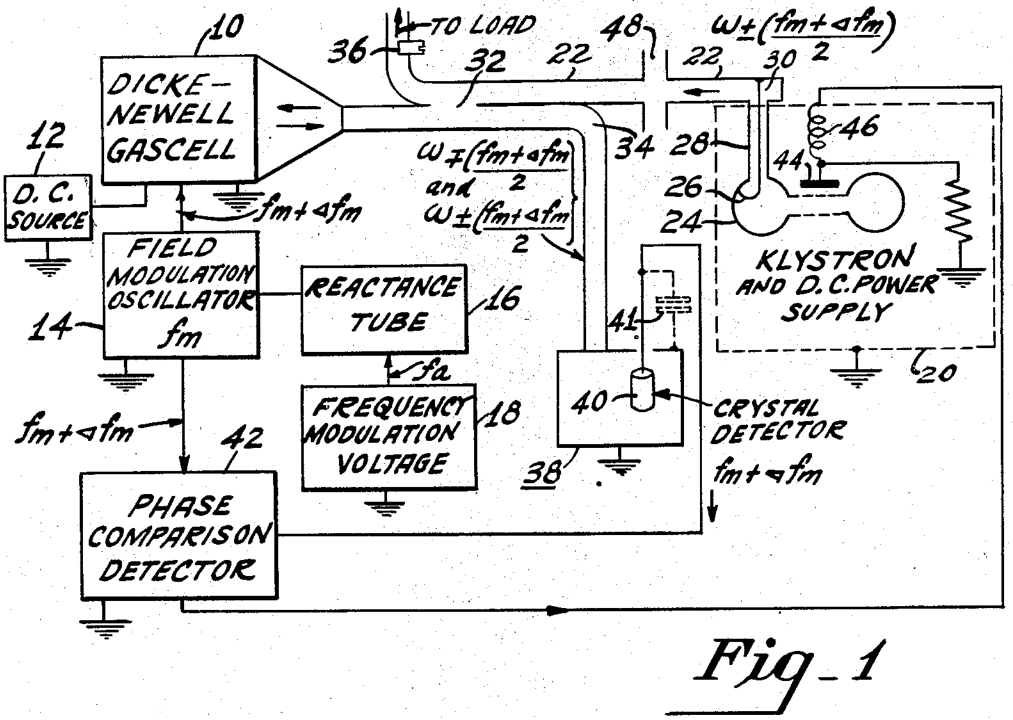

The present invention is related to frequency modulation, and particularly to a frequency modulation system with a molecular resonance control of the carrier or center frequency.

Frequency control by molecular resonance is known. Molecular resonance spectral lines are extremely narrow and gas resonance exhibits a greatly exaggerated phase shift with respect to frequency. Therefore, frequency control by gas molecular resonance phenomena provides an extremely high effective Q. The spectral lines of a gas are subject to broadening from various causes. The line width may be reduced by various means. In particular, the copending application of Robert H. Dicke and George S. Newell, Serial No. 243,082, filed August 22, 1951, now Patent No. 2,749,443, granted June 5, 1956, entitled Molecular Resonance System and Method discusses the causes contributing to the spectral line width of a gas. Further, the said application discloses a gas cell type having means for providing a field periodic in space and time in the cell. By means of this Dicke-Newell gas cell, the effective spectral line width of a gas may be reducd, thereby increasing the effective Q of a system employing such a cell for frequency control.

A modulation frequency is applied to a Dicke-Newell gas cell, so that the field mentioned has a periodicity at a modulation frequency. Consequently, the energy reflected from the gas has a spectral line at a frequency displaced by half the modulation frequency, this spectral line arising in response to energy incident on the cell at the other frequency displaced by half the modulation frequency. This spectral line has the properties of exaggerated phase shift of an anomalous dispersion, at the resonant frequency, but has a sharp increase in amplitude response at the line frequency. The spectral line has a reduced Doppler line width. It is known to use this spectral line for frequency control, for example as disclosed in the said application of Dicke and Newell.

It is an object of the present invention to provide a novel frequency modulation system.

Another object of the invention is to provide a frequency modulation system with an improved stabilization of the center frequency of the frequency modulated signal.

A further object of the invention is to provide a novel frequency modulation system especially suitable for frequency modulation or microwave signals of extremely high frequencies, for example in the range of the order of tens of thousands megacycles per second.

Another object of the invention is to provide a frequency modulation system which has the advantages of decreased gas spectral line width disclosed in the said Dicke and Newell application for control of the center frequency of the modulated signals.

In accordance with the invention, in a system wherein frequency control is obtained by means of the reflected spectral line of a Dicke-Newell cell, the line itself is caused to shift under control of the desired frequency modulation signal, by frequency-modulating the field modulation signal. The microwave signal is then frequency-modulated by a deviation of half the field modulation signal deviation.

Figures 2, 3A, 3B:
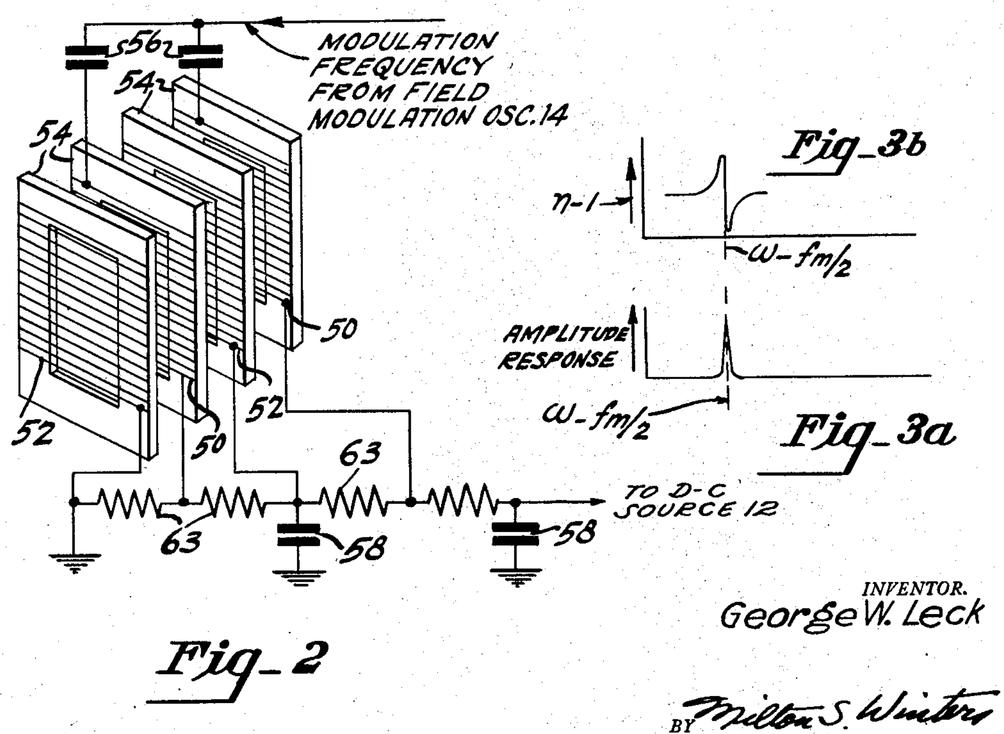

The foregoing and other objects, advantages, and novel features of the invention will be more fully apparent from the following description when read in connection with the accompanying drawing, in which like reference numerals refer to similar parts, and in which:

Fig. 1 is a diagram in schematic block form illustrating one embodiment of the invention; and Fig. 2 is a perspective view of the internal structure of one form of a Dicke-Newell gas cell.

Figs. 3*a* and 3*b* show curves useful in understanding the operation of the Dicke-Newell gas cell.

Referring to Fig. 1, a Dicke-Newell gas cell 10 is connected to receive voltage from a D. C. (direct current) source 12 and signal from a field modulation oscillator 14. The field modulation oscillator has suitable means for modulating the frequency of its oscillations about some mean frequency $f_m$. Such means may include a reactance tube 16 connected to the field modulation oscillator 14 and a source 18 of frequency modulation voltage with, for example, a frequency $f_a$, connected to the reactance tube 16. A klystron or other suitable microwave source of oscillations and a suitable D. C. power supply, indicated at 20, is connected by a hollow pipe waveguide 22 to a load (not shown). By way of example, microwave energy may be abstracted from the klystron output resonator 24 by a coupling loop 26, through a coaxial line 28. The outer conductor of coaxial line 28 is connected to the hollow pipe waveguide 22 wall at a stub termination of the waveguide 22, and the coaxial line 28 inner conductor extended through an aperture in the waveguide 22 wall to contact the opposite wall, to form a known type of coaxial line to waveguide coupling, designated as 30. The waveguide 22 leads to a microwave energy load (not shown) as indicated.

A directional coupler 32 may be in the form of a slot in a portion of the waveguide 22 wall in common with a wall portion of a second hollowpipe waveguide 34. Microwave energy from klystron 20 and waveguide 22 is coupled to the second hollow pipe waveguide 34 in a direction toward gas cell 10 which terminates one end of the second waveguide 34. Between the directional coupler 32 and the load, and preferably near the coupler 32, is a reflecting element 36, such as a screw threaded through the waveguide 22 wall, for a purpose which appears more fully hereinafter.

The energy reflected from the Dicke-Newell cell, and displaying the desired spectral line, returns to the other end of second waveguide 34 which is terminated in a mixer arrangement 38, which is in itself known. The mixer arrangement includes a crystal 40 inserted in a matched termination (not shown) of second waveguide 34, and mixes the displaced frequency spectral line energy and energy of the microwave oscillator 20 frequency.

The beat frequency is at the field modulation oscillator frequency. The beat frequency signals detected by mixer arrangement 38 may be applied to a phase comparison detector 42. The components at the microwave frequencies $$\omega \pm \frac{(f_m + \Delta f_m)}{2}$$

and $$\omega \mp \frac{(f_m + \Delta f_m)}{2}$$

are by-passed by a capacity 41 which may be included in the crystal mounting in known fashion. The phase comparison detector 42 is also connected to receive voltage from the field modulation oscillator 14. The phase between the field modulation oscillator 14 voltage and the beat frequency voltage from the mixer 38 are compared in phase detector 42 to provide a voltage having sense and amplitude corresponding to the phase difference between the compared voltages, which is at the frequency modulation frequency. For example, a zero voltage with respect to the common ground connection at the phase detector output may correspond to the in-phase condition for the compared voltages, and positive output voltages to one of the compared voltages leading, and negative output voltages for the other of the compared voltages leading. The phase comparison detector 42 output voltage is connected to a voltage responsive frequency control element, for example a reflector 44, of the klystron 20. The phase detector output voltage may be applied to the reflector 44 through a series-connected radio frequency choke. The radio frequency choke 46 permits free passage of the relatively low frequencies of the output voltage at the frequency modulation frequency from phase detector 42 to klystron reflector 44, but blocks the microwave frequency components. The microwave choke 46 may take other forms than a wound coil, as known. A suitable type of choke joint 48 may be employed in coaxial line 28 or in hollow pipe waveguide 22 as shown, to block the D. C. voltage of the klystron.

Referring to Fig. 2, a form of the Dicke-Newell cell suitable for employment in Fig. 1 is illustrated.

The Dicke-Newell gas cell may be described as a gas cell having means for providing a field periodic in time and space. One form of the gas cell internal structure is illustrated in Fig. 2. Other forms of gas cell are disclosed in the above-identified application of Robert H. Dicke and George S. Newell, Jr. A series of planar grids, alternate ones indicated as 50 and 52, all with wires parallel to a predetermined direction (shown horizontal) are mounted on metallic frames 54. The grids are dielectrically spaced apart preferably at a quarter of the wavelength of the undisturbed gas molecular resonance frequency $\omega$. The modulation oscillation from the field modulation oscillator may be applied through blocking capacitors 56 to alternate grids 50. A D. C. bias voltage, if required, may be applied by tapping off a series of voltage dividing resistors 63. The capacitors 58 by-pass any radio frequency (microwave) voltages on the other alternate grids 52. The grids are enclosed in an envelope (not shown) filled with the desired gas at reduced pressure, thus to be immersed in the gas. The microwave energy is applied to travel in a direction normal to the plane of the grids 50, 52 and polarized with the electric vector normal to the grid wires, to allow passage of the energy without serious obstruction by the grids, as shown in said Dicke and Newell application. Under these conditions, reflections or re-radiation takes places from the molecules of the gas. At either frequency $\omega \pm f_m/2$ for the incident energy, the reflections are coherent or constructive. The phenomenon is due to the spatial periodic and time periodic field between the grids. The D. C. voltage or field between grids is used with some molecules, as $NH_3$, where the Stark shift is quadratic, and by virtue of the cross product term produces a desired linear frequency shift due to a Stark field where otherwise the shift would be quadratic with applied field. If the shift of the gas frequency employed is linear with applied field, as with some gases, then the D. C. field may be omitted.

The time and spatial periodic fields give rise to two travelling Stark waves, either one of which may be employed. One wave travels in the direction of the incident microwave energy, and the other in the reverse. Due to the shift in resonant frequency of the gas in adjacent "laminations" enclosed by adjacent grids, and to the quarter wave thickness of each lamination, constructive reflections are received only from one velocity class of molecules moving in the direction (or the reverse) of the incident wave. Therefore, when the incident energy is $f_m/2$ above the undisturbed gas resonance, molecules moving with the incident energy, due to Doppler shift, are resonated at $\omega$ referred to the moving molecules. The reflected energy, due to Doppler shift, is reflected and received at frequency $\omega - f_m/2$. The reflected line, like the gas resonance line, exhibits anomalous dispersion, as shown in Fig. 3*a* where $n$ is the index of refraction, and also a resonance line, as shown in Fig. 3*b*, only one resonance line being shown, namely that one occurring when the incident frequency passes through $\omega + f_m/2$, giving rise to the line shown at $\omega - f_m/2$. Another line at $\omega - f_m/2$ resulting when the incident energy is at $\omega + f_m/2$ is not shown. The term resonance line used in this sense is intended to be interpreted as the spectral distribution of energy in the coherent reflection.

For further details and a more complete explanation of the gas cell operation, reference may be made to the aforesaid copending application of Dicke and Newell.

Referring again to Fig. 1, let the frequency $\omega$ be an undisturbed gas resonance frequency of the gas in cell 10. Let the frequency deviations from the center of the modulating frequency $f_m$ be $\Delta f_m$. Thus $\Delta f_m$ passes from zero to a maximum positive value to a minimum negative value and returns to zero in one cycle, the cycles being repeated with the frequency $f_a$, after the usual fashion for frequency modulation. The instantaneous frequency of the modulation voltage applied to the means for producing the periodic space and time fields of the cell is $f_m + \Delta f_m$. Let the frequency of the voltage incident on gas cell 10 from the microwave generator, the klystron 20, be $$\omega \pm \frac{(f_m + \Delta f_m)}{2}$$

where $\omega$ is the undisturbed gas resonance frequency. A portion of the energy $$\omega \pm \frac{(f_m + \Delta f_m)}{2}$$

is reflected by element 36, through directional coupler 32 toward mixer 38. This element 36 provides a sufficiently strong fixed phase reference signal to beat with energy reflected by the gas from cell 10. The reflected energy has a spectral line at $$\omega \mp \frac{(f_m + \Delta f_m)}{2}$$

The beat frequency at mixer 38 connected to the phase comparison detector 42 is therefore $f_m$. (By the usual convention, either the upper or the lower signs indicating plus or minus are read together). If the detected frequency is not the same as the reference frequency from the field modulation oscillator 14, the voltage applied by the phase comparison detector 42 is applied in a sense to change the frequency of microwave oscillator 20 to cause the beat frequency to be the same as $f_m + \Delta f_m$. In this connection, the exaggerated phase shift with frequency of reflected energy due to the spectral line causes the microwave oscillator 20 energy to track closely and substantially instantaneously at $$\omega \pm \frac{(f_m + \Delta f_m)}{2}$$

In order to assure that slow drift of the klystron is avoided, the average D. C. voltage of the klystron reflector 44 is returned to ground through a suitable resistor. It is thus apparent that there is generated by the microwave generator, oscillations at a closely controlled highly stable carrier of center frequency $\omega \pm f_m/2$, which is frequency modulated with deviations $\Delta f_m/2$ at a frequency $f_a$.

Although the modulation index $$m\left(m=\frac{\Delta f_m}{2\omega}\right)$$

is small, the high stability of the carrier frequency, the high degree of linearity of frequency modulation secured, and the difficulties encountered in suitable frequency modulation in other microwave frequency systems, especially at the high frequencies here contemplated, make the system useful. As an example of the frequencies which may be involved, $f_m$ may be 100 kilocycles per second, $f_a$ may be at audio frequencies, say 100 to 10,000 cycles per second, and $\omega$ may be an ammonia ($NH_3$) gas line resonance frequency, say 23,879.19 megacycles per second. A known type of suitable phase detector for detector 42 is disclosed in the copending application of Lowell E. Norton, Serial No. 148,481, filed March 8, 1950, now Patent 2,728,855 granted December 27, 1955 entitled Oscillator Frequency Control by Resonant Modulation of Gas. The phase detector arrangement is there disclosed in Fig. 9, and includes four diodes in a bridge arrangement. Also, in Fig. 11 of the said Norton application where diodes 85, 86, 87, and 88 are connected in a phase detector arrangement. Another suitable phase detector is disclosed as a phase coincidence detector 19 of Fig. 5 of a copending application of Lowell E. Norton, Serial No. 155,883, filed April 14, 1950, entitled Methods and Systems for Controlling the Frequencies of Generated Oscillations. The manner of connection of one of these or other known phase detectors in the circuit arrangement shown in block form in Fig. 1 will be understood by those skilled in the art. Opposite phased inputs preferably are employed. Although the said Norton phase detectors are employed for pulse phase detection in the said Norton applications, they may be employed for phase detection of sinusoidal wave inputs also. Other suitable phase detector circuits are known to the art.

It is apparent that the invention discloses a system for frequency modulation of microwaves which affords high stability of the carrier frequency and a high degree of linearity of frequency modulation.

What is claimed is:

1. A frequency modulation system comprising a gas cell of the type having means for providing a field periodic in time and space, means for applying field modulation signals to said gas cell means, means to frequency-modulate said field modulation signals, a microwave generator having frequency control means, means to apply energy from said microwave generator to said gas cell to derive energy reflected from said gas, means to recover the difference frequency signal between energy at the microwave generator frequency and the reflected energy, means to compare the said difference frequency with the frequency of said field modulation signals and to derive a frequency control voltage in accordance with said comparison, and means to apply said frequency control voltage to said frequency control means, whereby the said microwave generator is frequency-modulated and its carrier frequency is frequency stabilized.

2. A frequency modulation system comprising a gas cell of the type having means for providing a field periodic in time and space, means for applying field modulation oscillations of frequency $f_m$ to said gas cell means, means to vary the frequency of said field modulation oscillations in accordance with a frequency modulation signal, a microwave generator having a voltage responsive frequency control element, means coupled to microwave generator to receive energy therefrom and coupled to said cell to receive energy reflected from said gas cell to derive the beat frequency energy therebetween, a phase comparison detector connected to receive energy at said field modulation oscillations and from said beat frequency deriving means to compare the phase difference therebetween and having an output voltage responsive in sense and amplitude to said phase difference, said microwave generator voltage responsive frequency control element being connected to said phase comparison detector to receive said phase difference responsive voltage.

3. The system claimed in claim 1, said gas cell means being planar parallel grids spaced at a quarter wavelength at the mean frequency of microwave generator oscillations.

4. A frequency modulation system comprising a gas cell having means for providing a field periodic in space and time, means to produce field modulation oscillations with a center frequency $f_m$, means to frequency modulate said field modulation oscillations with a frequency $f_a$ and with frequency deviations $\Delta f_m$, a microwave generator having a center frequency of oscillations $\omega \pm f_m$, where $\omega$ is the undisturbed resonance of the gas of said gas cell, said microwave frequency being responsive to a frequency control voltage, means to couple said gas cell and said microwave generator to apply to said gas cell energy from said microwave generator, means to derive energy at the beat frequency between energy re-radiated coherently from the gas of said cell and energy at the frequency so applied to said cell, means to compare the phase of said beat frequency output at frequency $f_m+\Delta f_m$ and said field modulation oscillations at frequency $f_m+\Delta f_m$ to derive a frequency control voltage having sense and amplitude corresponding to the phase difference of the compared outputs, and means to connect said frequency control voltage to said microwave generator as the frequency control voltage thereof, whereby the said microwave energy has substantially the instantaneous frequency $$\omega \pm \frac{(f_m+\Delta f_m)}{2}$$

and is frequency modulated about the center frequency $\omega \pm f_m/2$ at a frequency $f_a$ with a frequency deviation $$\frac{\Delta f_m}{2}$$

5. The frequency modulation system claimed in claim 4, said microwave generator being a klystron.

6. The frequency modulation system claimed in claim 4, said means to derive the beat frequency comprising a crystal detector.

7. The frequency modulation system claimed in claim 6, said means to compare phase comprising a phase detector.

8. The frequency modulation system claimed in claim 4, said microwave generator being a klystron having a reflector, said frequency control voltage being the voltage applied to said reflector.

References Cited in the file of this patent

UNITED STATES PATENTS

| | | |
|---|---|---|
| 2,591,258 | Hershberger | Apr. 1, 1952 |
| 2,602,835 | Hershberger | July 8, 1952 |